(12) United States Patent
Verma et al.

(10) Patent No.: US 12,549,826 B1
(45) Date of Patent: Feb. 10, 2026

(54) AUTOMATIC SELECTION OF COMPRESSION ARTIFACT REMOVAL MODELS

(71) Applicant: Amazon Technologies, Inc., Seattle, WA (US)

(72) Inventors: Shashwat Verma, San Jose, CA (US); Wen Ma, San Jose, CA (US); John Charles Wright, Oakland, CA (US); Tariq Afzal, San Jose, CA (US); Sankalp Dayal, San Mateo, CA (US); Prajit Kulkarni, Santa Clara, CA (US); Om Prakash Gangwal, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 140 days.

(21) Appl. No.: 18/620,982

(22) Filed: Mar. 28, 2024

(51) Int. Cl.
*H04N 21/81* (2011.01)
*G06V 10/764* (2022.01)
*H04N 7/01* (2006.01)

(52) U.S. Cl.
CPC ......... *H04N 21/816* (2013.01); *G06V 10/764* (2022.01); *H04N 7/0117* (2013.01)

(58) Field of Classification Search
None
See application file for complete search history.

(56) References Cited

U.S. PATENT DOCUMENTS

| | | | |
|---|---|---|---|
| 12,062,367 B1 * | 8/2024 | Huynh | G10L 15/063 |
| 2025/0166131 A1 * | 5/2025 | Yun | G06T 5/50 |
| 2025/0254402 A1 * | 8/2025 | Hendry | H04N 21/8133 |

* cited by examiner

Primary Examiner — Junior O Mendoza
(74) Attorney, Agent, or Firm — K&L Gates LLP (57) ABSTRACT

Systems and techniques are generally described for selecting a machine learning model for compression artifact removal and resolution upscaling of video streaming data. In various examples, a system or method receives a stream of video data, determines a category of the stream of video data based at least partially upon a compression level of the stream of video data, selects weights for a machine learning model based upon the category, and executes the machine learning model with the selected weights to remove compression artifacts in the stream of video data and upscale a resolution of the stream of video data.

20 Claims, 7 Drawing Sheets

AUTOMATIC SELECTION OF COMPRESSION ARTIFACT REMOVAL MODELS

BACKGROUND

Streaming video data typically involves compression, in which frames of a stream of video data are mathematically condensed to reduce a bandwidth required to transmit the stream of video data.

DETAILED DESCRIPTION

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Streaming video data typically involves compression, in which frames of a stream of video data are mathematically condensed to reduce a bandwidth required to transmit the stream of video data. Many commonly used algorithms for video data compression are inherently lossy; they compress the video data for transmission by reducing a level of detail contained in the video data. The reduction in detail resulting from a compression process can thus result in less-than-desirable quality degradation when decoding a compressed stream of video data (e.g., on the receiver side). This quality degradation may manifest as reduced resolution and may include compression artifacts such as compression blocks (e.g., discrete cosine transform (DCT) blocks) and/or sharp edges between separately condensed slices of a frame.

Machine learning techniques offer one potential approach to solving the above issues. Such solutions, however, present new and unique challenges not previously foreseen. In particular, machine learning models at the time of the writing of the present disclosure are typically very good at performing a narrow range of tasks, but may not be well suited to more varied work. That is to say, a machine learning model which, for example, is very good at removing compression artifacts from a highly compressed sports video stream may perform quite poorly when presented with a lightly compressed soap opera, and vice versa. It is thus very difficult to implement effective machine learning-based artifact removal and upscaling in an environment where a variety of genres and levels of compression of video data may be encountered, and a system which can adapt to a particular scenario rapidly is highly desirable.

Described herein are various systems and techniques effective to select and execute a machine learning model from a group of two or more machine learning models for artifact removal and resolution upscaling of a stream of video data. By monitoring at least one of a content and a compression level of the stream of video data, artifact removal and resolution upscaling techniques can be swapped "on the fly" in reaction to changes to a particular scenario. Since machine learning models are selected in response to a determination of at least one of content and compression level, each machine learning model for performing artifact removal and upscaling may be trained on a dataset consistent with a particular scenario in which that machine learning model is intended to be deployed. This allows for individual models to be highly specialized to a particular scenario, and thus results in an output of greater quality than a generalized machine learning model would currently be capable of producing.

Video data is frequently compressed to reduce the amount of data necessary to represent a given length of video at a given resolution. This compression is generally characterized as encoding video data.

So-called lossy compression typically refers to intra-frame compression where the amount of data used to represent a given picture is reduced relative to a raw or native format of the picture. One common example of intra-frame compression uses a frequency domain-based image transform such as a discrete cosine transform (DCT), a Fourier transform, a Hadamard transform, an integer transform, etc., to represent the image data in the frequency domain.

In DCT, coefficients of different frequency cosine waves are calculated based on the contribution of the different frequency cosine waves to the portion of the image being encoded. After subjecting image data to a DCT, the lower frequency cosine wave coefficients are typically much larger relative to the higher frequency cosine wave coefficients. This is due to the higher frequency cosine waves typically having a less significant impact (i.e., the higher frequency cosine waves contribute less to the image or portion of the image) on the image being encoded and the lower frequency cosine waves having a more significant impact on the image being encoded. The coefficients of the different frequency cosine waves may be divided by quantization factors during a quantization process and rounded to the nearest integer, to further compress the data. In various examples, the quantization factors may be determined using a rate control algorithm. A rate control algorithm may solve an optimization problem to determine the number of bits that should be used to encode macroblocks (two-dimensional groupings of contiguous pixels in the picture) of image data and/or a frame of image data at a given level of image quality and/or at a given level of distortion. In some other examples, a rate control algorithm may solve an optimization problem to determine a level of image quality at a given number of bits. Image quality may be determined using peak signal to noise ratio (PSNR) and/or structural similarity index (SSIM), for example.

After quantization, several zero value coefficients are typically present in the high frequency cosine wave range of the compressed image data. The list of quantized coefficients can be serialized using, for example, a "zig zag" scan of the array of quantized coefficients. The serialized list of quantized coefficients can be further compressed using an entropy encoding process, such as binary arithmetic encoding or Huffman encoding, to reduce the number of bits necessary to represent the compressed image data.

One technique potentially relevant to analysis methods disclosed herein is motion analysis in video data. Motion analysis algorithms can be divided into several broad categories, including but not limited to phase correlation, block matching, optical flow, corner detection, and pixel recursion. All of these techniques ultimately compare two images, divide the images in some way (often into one or more "macroblocks" representative of people, animals, or objects which may move between two images), then attempt to output one or more motion vectors indicative of where motion occurred between the two images. Magnitudes of these vectors may be summed to yield a quantification of motion in a scene, which may in turn be used by a classifier to select an artifact removal and upscaling model as described herein.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, a machine learning model takes input data in an expected structure or format and performs one or more operations on it based on parameters of the model to produce output data. The one or more parameters include weights, and likely other parameters, that have been learned/determined during a training process. A machine learning model may be characterized as including one or more layers of nodes (sometimes characterized as neurons), with the layers of nodes generally taking input from a previous layer (or initial input) and providing output to a subsequent layer (although in some models input and output may not flow through layers in a purely linear fashion, e.g. may travel back to a previous layer, etc.).

Layers of a neural network commonly utilize an activation function to introduce non-linearity. Perhaps the most commonly utilized activation function is the Rectified Linear Unit activation function, $f(z)=\max(0,z)$. Other common activation functions include the sigmoid function $\sigma(z)=1/(1+e^{-z})$ and the tanh function $f(z)=2\sigma(2z)-1$, or $f(z)=2*(1/(1+e^{-2z}))-1$.

Thus, for example, a layer may be defined to take input from a previous node in the form of a vector, perform a set of one or more matrix multiplication operations using the input and weights of the layer, and then perform operations to implement an activation function, with the output of the activation function being provided to a subsequent layer.

In addition, a bias value can be used to shift input or output to or from the activation function (e.g., by a positive or negative value and may bias a neuron toward activation).

Generally, in machine learning models, such as neural networks, after initialization, annotated training data may be used to generate a cost or "loss" function that represents or quantizes difference between expected or desired output of the machine learning model and actual output. The parameters (e.g., weights and/or biases) of the machine learning model may be updated to minimize (or maximize) the cost or loss. For example, the machine learning model may use a gradient descent (or ascent) algorithm to incrementally adjust the weights to decrease (or increase) the output of the cost or loss function. A common method of updating the parameters of the machine learning model is often referred to as back propagation.

Figure 1:
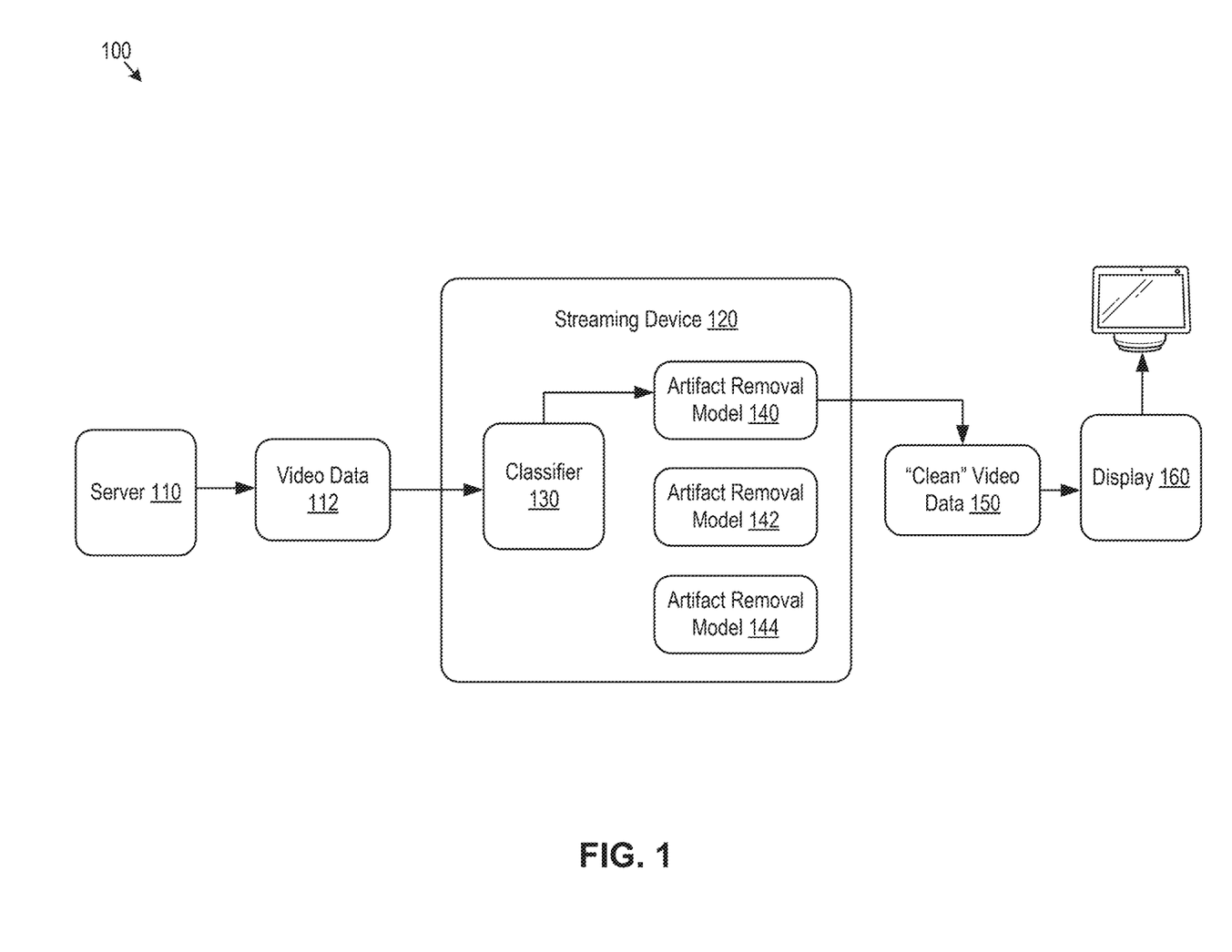
FIG. 1 is a block diagram illustrating an example system for selection of an artifact removal model, in accordance with various aspects of the present disclosure.

FIG. 1 is a block diagram illustrating an example system 100 for selecting and executing a machine learning model from a group of two or more machine learning models for artifact removal and resolution upscaling of a stream of compressed video data 112. In this example system 100, a server 110 sends a stream of compressed video data 112 to a streaming device 120. The streaming device 120 may be any device that is expected to stream video data 112, including but not limited to a smart television, a computer, a tablet, a phone or handheld device, a game console, or a wireless communication-enabled peripheral that interfaces with a display device such as a streaming dongle. The streaming device 120 may execute a classifier 130 which may select one of a first artifact removal model 140, a second artifact removal model 142, or a third artifact removal model 144. In this example scenario, the classifier 130 (see, FIG. 2 and FIG. 3 for greater detail) selects the first artifact removal model 140, which then receives the stream of compressed video data 112. The first artifact removal model 140 may then remove compression artifacts or upscale the stream of compressed video data to produce "clean" video data 150 which may then be sent to a display 160 for viewing.

Each of the first artifact removal model 140, the second artifact removal model 142, and the third artifact removal model 144 may be machine learning models configured to accept video data 112 containing artifacts as input and to output "clean" video data 150. This may be achieved by, for example, implementing a deep convolutional or recurrent neural network with multiple layers of convolution, batch normalization, and activation (e.g. leaky rectified linear unit) operations and techniques such as residual representation and generative image processing. In addition to the above structures and techniques, temporal smoothing may be employed, wherein a model is biased towards producing an image for a given frame or slice which is similar in appearance to previously output frames or slices. This may be achieved by employing motion search techniques to match regions of previously processed slices or frames that are likely to contain a same subject to one that is in a slice or frame currently being processed. The model may then use this matching to "fill in" information gaps resulting from compression artifacts and produce a consistent appearance throughout a video.

The removal of compression artifacts and upscaling of the stream of compressed video data 112 resolution may occur prior to a decoding of the stream of compressed video data 112 (pre-processing) or subsequent to the decoding the stream of compressed video data 112 (post-processing). In some scenarios, removal of compression artifacts may occur in pre-processing while upscaling occurs in post-processing or vice versa. Some scenarios may also involve performing one or both of the artifact removal and upscaling in both the pre-processing and post-processing stages. The classifier 130 may inspect the stream of compressed video data 112, metadata describing the stream of compressed video data 112, or combinations thereof to select the first artifact removal model 140. This inspection may likewise occur before or after the decoding of the stream of compressed video data 112. The classifier 130 may employ a rules-based technique for selecting the first artifact removal model 140, a machine learning-based technique for doing the same, or combinations thereof. For example, the classifier 130 may accept as input genre metadata defining a genre of the video data 112, quantization parameter (QP) values indicative of compression levels, and metadata indicative of a quantity of motion within a group of slices or frames. It should be noted that the particular model inputs may vary according to the desired implementation and that this particular combination of inputs is used for illustrative purposes only. These may be input, for example, as (genre1, QP2, motion_value, ground truth model label) into a multi-class classifier trained with supervised learning techniques on a variety of similar datasets (see FIG. 3). These datasets may be historical data including the aforementioned metadata and quantization parameter values in the aforementioned "(genre1, QP2, motion_value, ground truth model label)" format for a variety of scenarios with varied video data 112. The datasets may be labelled with a desired output selection corresponding to a compression level and/or content of the video data 112 for each entry to the dataset, respectively, of the metadata and the quantization parameters. The classifier 130 may generate a predicted model label for each set of inputs and loss may be determined (e.g., cross-entropy loss or any other suitable loss function, according to the desired implementation). After evaluating training samples during a particular training iteration, a gradient may be calculated from the loss and back propagation may be used to modify the current parameters of the classifier 130 in order to minimize the loss. This process is recursive and may be repeated until the model converges.

As used in the present disclosure, the term "content" when used in reference to the stream of compressed video data 112 is taken to mean anything contained within a payload of the stream of compressed video data 112. For example, a content of the stream of compressed video data 112 may include but is not limited to a genre of an encoded video, objects or individuals depicted in the stream of compressed video data 112, audio data included with the stream of compressed video data 112, themes and topics addressed in the stream of compressed video data 112, visual metrics such as but not limited to saturation, contrast, and color palettes of the stream of compressed video data 112, a cinematographic style of the stream of compressed video data 112, encoded representations of the same (e.g. binary representing the payload), or combinations thereof. A content of the stream of compressed video data 112 may be ascertained by inspection of metadata included with the stream of compressed video data 112, direct analysis of the stream of compressed video data 112, other techniques, or combinations thereof. Similarly, the term "metadata" as used in the present disclosure is meant to include any data provided to describe the stream of compressed video data 112 including but not limited to captioning data, data about a content of the stream of compressed video data 112, data about a compression level of the stream of compressed video data 112, encoded representations of the same, or combinations thereof.

In some scenarios, the classifier 130 may choose the second artifact removal model 142 or the third artifact removal model 144 instead of the first artifact removal model 140. This may be based upon metrics or content analysis of the stream of compressed video data 112. In some scenarios, the classifier 130 may change artifact removal models during processing of the stream of compressed video data 112. For example, a connection between the server 110 and the streaming device 120 being used to transmit the stream of compressed video data 112 with a light level of compression may become congested, requiring additional compression of the stream of compressed video data 112 by the server 110. This increase in compression level may be detected by the classifier 130, which may then switch from the first artifact removal model 140, which may be configured to handle lightly compressed video data, to the second artifact removal model 142, which may be configured to handle moderately compressed video data. It will be appreciated that more than three artifact removal models may be included in the system 100, and that the inclusion of three such models is merely for illustrative purposes.

In yet more example scenarios, the classifier 130 may choose more than one artifact removal model to process a single frame or slice. In a further example, the classifier 130 may select artifact removal models at the macroblock level (or at the level of a grouping of macroblocks). For example, the classifier 130 may determine that a single frame or slice contains portions of both a sky and a tree. In this example scenario, the first artifact removal model 140 may be trained to process images of skies and the second artifact removal model 142 may be trained to process images of trees. The classifier 130 may thus select the first artifact removal model 140 to process a portion of the single frame or slice that contains sky and may select the second artifact removal model 142 to process a portion of the single frame or slice that contains the tree. This may be accomplished by isolating the sky and the tree within the frame or slice (e.g., via image segmentation), splitting the frame or slice into two sub-images wherein each sub-image contains only the tree or only the sky, and sending each resulting sub-image to the appropriate artifact removal model for processing. Alternatively, the classifier 130 may tag portions of the frame or slice with metadata indicating which regions of the frame or slice should be processed by which artifact removal model. It will be appreciated that while these are two potential approaches to selecting multiple artifact removal models for a single frame or slice, any technique of processing an image with two or more different image-processing machine learning models may be employed, including but not limited to techniques that process portions of each image with different models and those that employ a multi-stage technique to send an entire frame or slice through multiple models sequentially.

It will also be appreciated that though this disclosure presents the methods and techniques herein primarily in the context of a streaming device 120 performing processing client-side, it is also possible to perform some or all of the methods and techniques disclosed herein in a cloud or server environment. For example, a server, cloud environment, or distributed computing environment may execute the classifier 130. In such a scenario, the server, cloud environment, or distributed computing environment may package an output of the classifier 130 with the video data 112 as metadata which may be employed by the streaming device 120 to select artifact removal models for client-side execution. Alternatively, the server, cloud environment, or distributed computing environment may receive the stream of video data 112 in a compressed state and determine that a lower level of compression can be employed when forwarding the stream of video data 112 to the streaming device 120. In such a scenario, the server, cloud environment, or distributed computing environment may execute the classifier 130 and the first artifact removal model 140 before sending the stream of video data 112 to the streaming device 120. The streaming device 120 may then display the video data 112 as-is or may repeat execution of the classifier 130 and the first artifact removal model 140 (or a different artifact removal model, particularly since the compression level will be different from that used by the server, cloud environment, or distributed computing environment when selecting the first artifact removal model 140) to further "clean" the video data 112.

Figure 2:
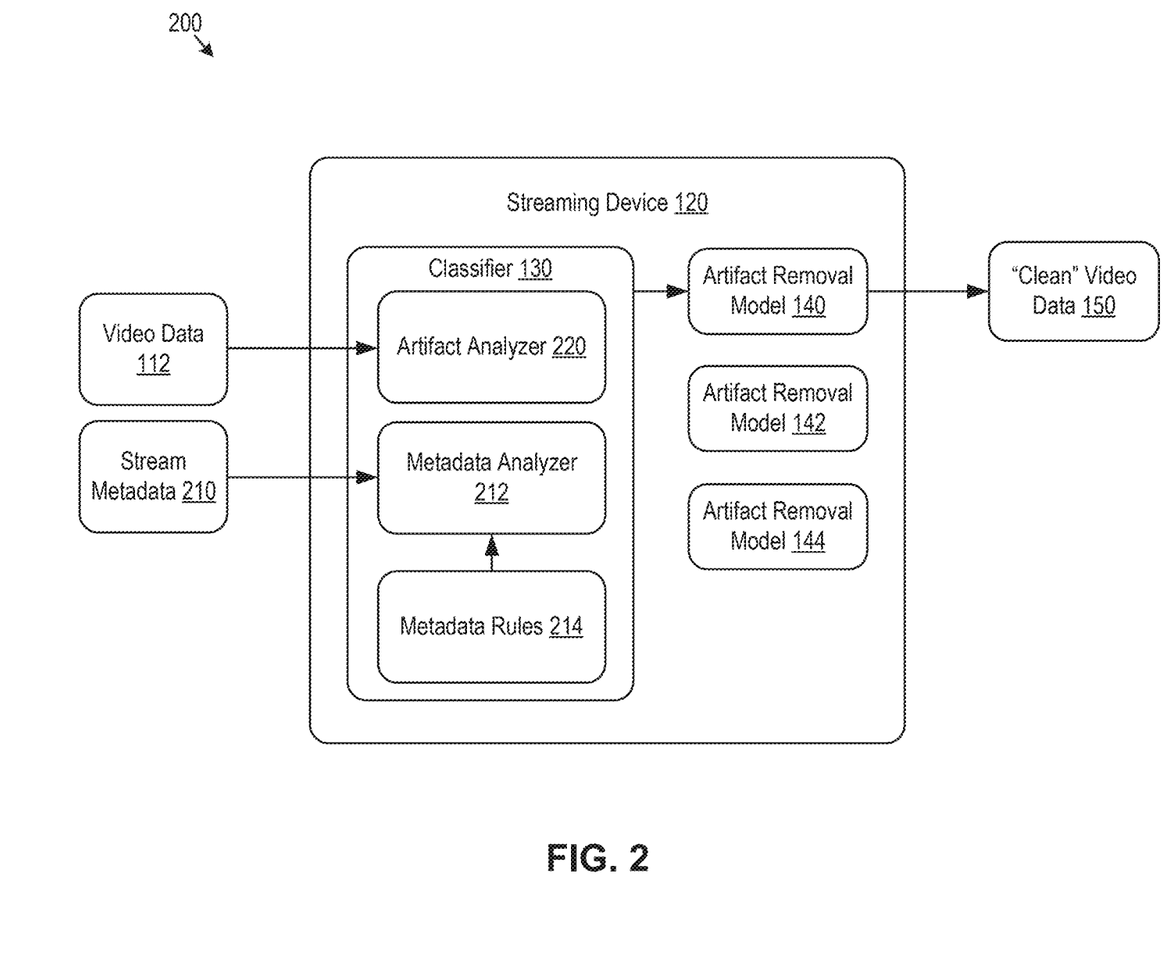
FIG. 2 is a block diagram illustrating an example streaming device with a rules-based classifier, according to various embodiments of the present disclosure.

FIG. 2 is a block diagram 200 illustrating an example streaming device 120 with a rules-based classifier 130, according to various embodiments of the present disclosure. In this example embodiment, an artifact analyzer 220 accepts video data 112 from an external source, such as a server (see FIG. 1). The artifact analyzer 220 may perform various analysis techniques on the video data 112 to detect compression artifacts, such as but not limited to edge detection and color analysis. A metadata analyzer 212 may analyze metadata 210 of the video data 112, which may be supplied in a stream parallel to the video data 112. The metadata 210 may also be included within a stream of the video data 112, extracted from but not explicitly reported within the stream of video data 112, or combinations thereof.

The metadata analyzer 212 may consult one or more metadata rules 214. The metadata rules 214 may include conditions for categorizing the video data 112 based upon the metadata 210. For example, the metadata rules 214 may include a condition specifying that a quantization parameter value between 1 and 17 (these being example values, actual values may differ) constitutes light compression. As a further example, metadata rules 214 may also contain conditions specifying that a director listing of "Peter Jackson" is likely to correspond to a video in a fantasy genre. Therefore, metadata 210 containing a quantization parameter of 8 and listing "Peter Jackson" as a director might cause the metadata analyzer to bias the classifier 130 towards choosing an artifact removal model trained on fantasy videos with light compression. The metadata analyzer 212 may also store portions of the metadata 210 and perform analysis on representations of the stored metadata 210. For example, the metadata analyzer 212 may generate and inspect a histogram of quantization parameter values and inspect that histogram to determine a trend or rolling average when choosing the first artifact removal model 140.

The classifier 130 may combine an output of the metadata analyzer 212 with an output of the artifact analyzer 220 to select an artifact removal model. This may involve weighting recommendations of the artifact analyzer 220 with those of the metadata analyzer 212 to produce a selection. For example, if the metadata analyzer outputs a determination that the video data 112 contains a lightly compressed fantasy video, while the artifact analyzer 220 detects severe boundary lines in a slice or frame of the video data 112, the classifier 130 may weight each output equally to choose an artifact removal model trained on moderately compressed fantasy videos. Alternatively, artifact removal models may be differentiated according to genre, compression level, and artifact severity. In such a case, no weighting may be required. It will be appreciated that the artifact analyzer 220 or the metadata analyzer 212 may be excluded, and that embodiments of the present disclosure may solely rely upon the metadata analyzer 212 or the artifact analyzer 220 to determine an artifact removal model. It will also be appreciated that although the above description contemplates equal weighting of the artifact analyzer 220 and the metadata analyzer 212, any combination of weighting may be employed including but not limited to dynamic weighting, uneven weighting, zero weighting of the artifact analyzer 220 and the metadata analyzer 212, and combinations thereof. It will also be appreciated that the metadata analyzer 212 or the classifier 130 may weigh differing types of metadata differently. For example, the classifier 130 or the metadata analyzer 212 may assign a heavier weight to the quantization parameter than to other metrics.

The artifact analyzer 220 may receive the video data 112 in either a compressed or a decoded state and apply a smoothing algorithm proportional to an intensity of any detected boundaries within a slice or frame. The smoothing algorithm may be part of the first artifact removal model 140. The classifier 130 may monitor the video data 112 continuously or periodically, and may switch the selected artifact removal model based upon changes in the video data 112 or the metadata 210. The first artifact removal model 140, the second artifact removal model 142, or the third artifact removal model 144 may output "clean" video data 150 which may include the video data 112 after artifact removal and upscaling. The "clean" video data 150 may then be displayed on a display (see FIG. 1).

Figure 3:
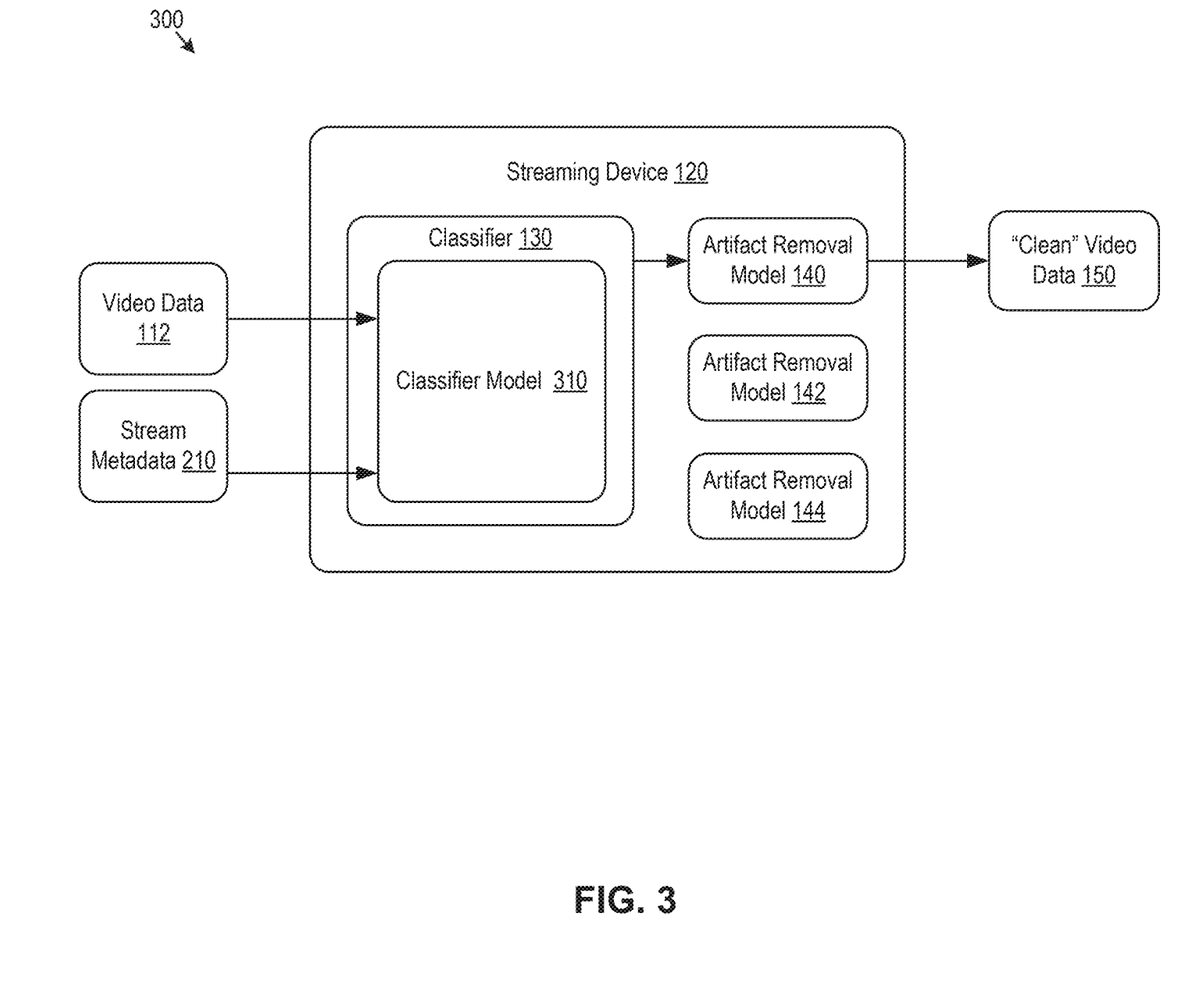
FIG. 3 is a block diagram illustrating an example streaming device with a machine learning-based classifier, in accordance with various aspects of the present disclosure.

FIG. 3 is a block diagram 300 illustrating an example streaming device 120 with a machine learning-based classifier 130, in accordance with various aspects of the present disclosure. The classifier 130 may perform similarly to that which is illustrated in FIG. 2, but in this example, the classifier 130 may employ a classifier model 310 to select the first artifact removal model 140. The classifier model 310 may be any machine learning-based model, including but not limited to a neural network, a convolutional neural network, a recurrent neural network, a vision transformer, a state vector machine, a random forest, or a decision tree. The classifier model 310 may be trained using any method including but not limited to supervised learning, unsupervised learning, semi-supervised learning, and combinations thereof. The classifier model 310 may be trained with historical video data, which may be tagged or untagged. The historical video data may include data which has been compressed to a variety of intensities, and may include corresponding metadata 210. The classifier model 310 may be trained with various combinations of video data 112 with and without the metadata 210.

In some example scenarios, the classifier 310 may be trained to simply accept quantization parameter values and metadata 210 indicating motion in a scene. Such an example implementation may not require much complexity, and a neural network trained with reinforcement learning on pairings of motion metadata 210 and quantization parameters (training data) with tagged output values would be fairly easy to implement. Training in this instance might involve an evolutionary approach, wherein batches of neural networks with random modifications are tested on the training data and scored with the tagged outputs, then a predetermined fraction of the best-scoring neural networks may be used as a basis for a subsequent batch of neural networks for testing. This training process may repeat any number of times, likely until performance of at least one neural network exceeds a desired threshold. Such a classifier 310 may be configured to output a model index value, wherein the model index value is indicative of a selection of the first artifact removal model 140.

In some scenarios, the classifier 130 of FIG. 2 or FIG. 3 may operate with no or limited metadata 210. In such situations and where the classifier 130 employs a classifier model 310 to select the first artifact removal model 140, the classifier model 310 may analyze a content of the video data 112 to determine the metadata 210. For example, the classifier model 310 may identify objects or individuals in frames or slices of the video data 112, words included in captions associated with the video data 112, spoken words of the video data 112, optical character recognition of words displayed in the video data 112, other elements of the video data 112, or combinations thereof to determine the metadata 210. In some embodiments, a classifier model 310 may be paired with a metadata analyzer 212 (see FIG. 2) to determine the metadata 210 and then apply rules-based analysis, respectively.

The classifier model 310 may also detect and analyze artifacts in the video data 112. The classifier model 310 may identify these artifacts and apply a smoothing algorithm (which may be a part of the first artifact removal model 140) proportional to a hardness of one or more boundaries in a slice or frame image of the video data 112. The first artifact removal model 140 may then receive the video data 112, which may be in a compressed state or a decoded state, and output "clean" video data 150 which has fewer or no artifacts and which has been upscaled in resolution.

Figure 4:
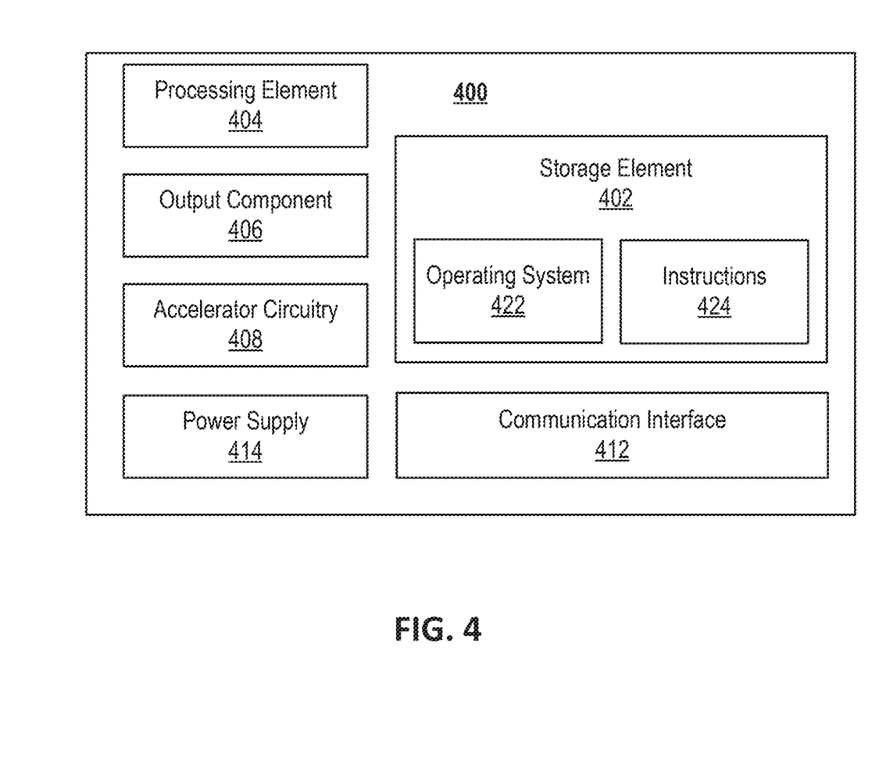
FIG. 4 is a block diagram showing an example architecture of a computing device that may be used in accordance with various embodiments described herein.

FIG. 4 is a block diagram showing an example architecture 400 of a computing device that may be used in accordance with various embodiments described herein. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to generate an experiment and analyze results of that experiment. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise one or more components of the system 100 for generation and execution of experiments.

The storage element 402 may also store software for execution by the processing element 404 in the form of instructions 424. An operating system 422 may provide the user with an interface for operating the computing device and may facilitate communications and commands between applications executing on the architecture 400 and various hardware thereof.

When implemented in some user devices, the architecture 400 may also comprise an output component 406. The output component 406 may comprise a communication port or transmitter for a display, one or more light-emitting diodes (LEDs), or other suitable display lamps. Also, in some examples, the output component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, output component 406 may be effective to display content determined provided by a skill executed by the processing element 404 and/or by another computing device.

The architecture 400 may also include one or more accelerator circuitries 408 configured to accelerate a speed of machine learning model computations. The accelerator circuitry 408 may be dedicated processing circuitry such as but not limited to an ASIC, a GPU, or any other circuitry which may be used as a hardware accelerator.

The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module configured to communicate on a network, such as a computer communication network, according to any suitable wireless protocol, such as IEEE 802.11 or another suitable wireless local area network (WLAN) protocol. A short range interface may be configured to communicate using one or more short range wireless protocols such as, for example, near field communications (NFC), Bluetooth, Bluetooth LE, etc. A mobile interface may be configured to communicate utilizing a cellular or other mobile protocol. A Global Positioning System (GPS) interface may be in communication with one or more earth-orbiting satellites or other suitable position-determining systems to identify a position of the architecture 400. A wired communication module may be configured to communicate according to the USB protocol or any other suitable protocol.

Figure 5:
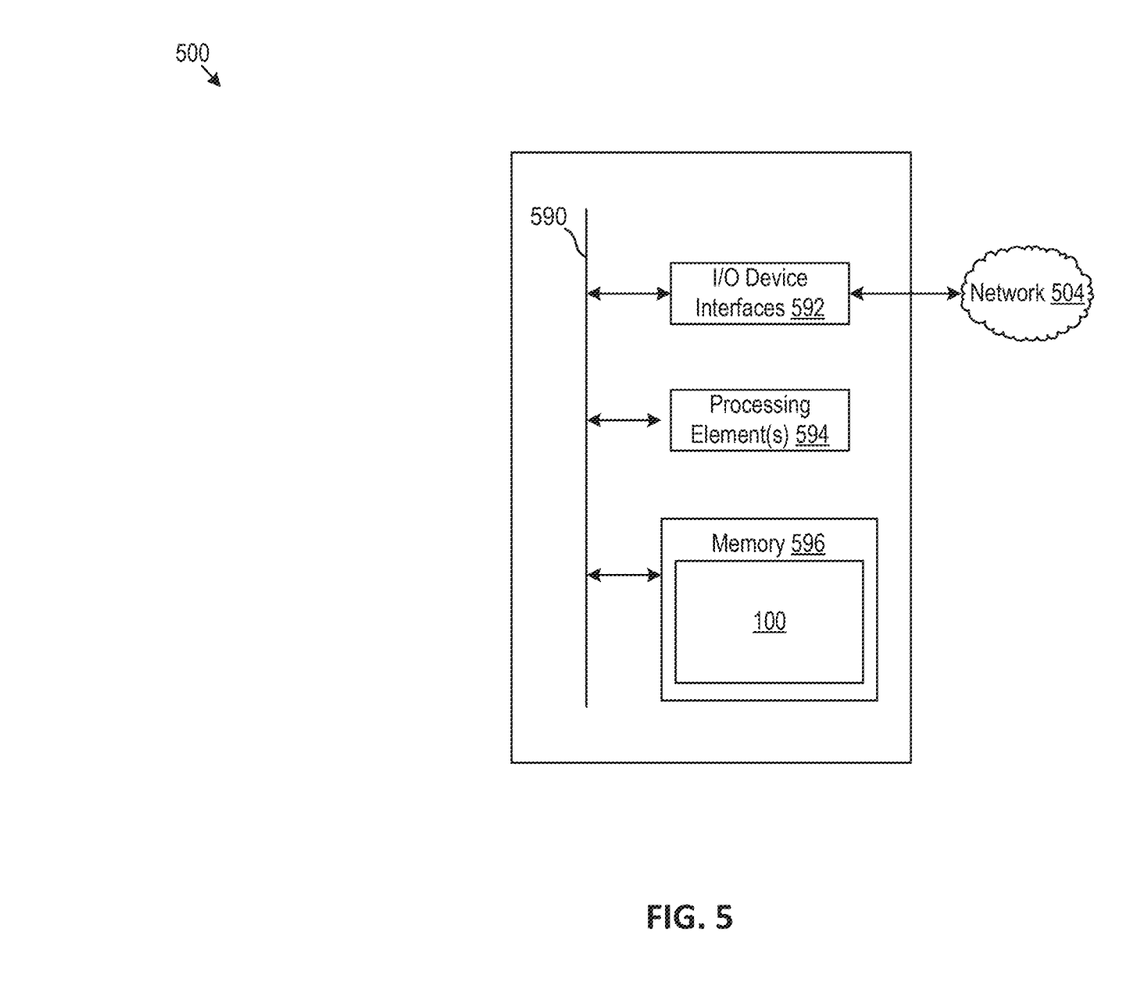
FIG. 5 is a block diagram showing an example architecture of a network-connected device that may be used in accordance with various embodiments described herein.

FIG. 5 is a block diagram conceptually illustrating example components of a remote device 500, such as a computing device executing a particular skill, a computing device executing one or more components of an experiment generation and execution system 100 and/or command processing. For example, the various components of FIG. 5 may be used to implement the system 100 for generation and execution of experiments. Multiple computing devices may be included in the system, such as one input text processing computing device for performing parameter and metric identification, experiment generation and execution computing device for creating and running experiments based on the parameters, one or more analysis computing device(s) processing experiment output data, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of an experiment generation and execution system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the streaming device 120, such as machine learned models associated with various classifiers and/or artifact removal and upscaling algorithms, when loaded from memory 596. In various further examples, memory 596 may be effective to store instructions effective to program controllers/processors 594 to perform the various techniques described above in reference to FIGS. 1-3. Accordingly, in FIG. 5, the system 100 for experiment generation and execution is depicted as being stored within memory 596, as an example. The memories 596 may individually include volatile random access memory (RAM), non-volatile read only memory (ROM), non-volatile magnetoresistive memory (MRAM), and/or other types of memory. Each computing device of an experiment generation and execution system (and/or a component thereof) may also include memory 596 for storing data and controller/processor-executable instructions. Each memory 596 may individually include one or more non-volatile storage types such as magnetic storage, optical storage, solid-state storage, etc. Each computing device of an experiment generation and execution system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of the experiment generation and execution system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of the various computing devices described herein may include input/output device interfaces 592. A variety of components may be connected through the input/output device interfaces 592, as will be discussed further below. Additionally, each computing device of an experiment generation and execution system may include an address/data bus 590 for conveying data among components of the respective device. Each component within a computing device of an experiment generation and execution system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of an experiment generation and execution system, as described herein, are exemplary, and may be located as a stand-alone device or may be included, in whole or in part, as a component of a larger device or system.

Figure 6:
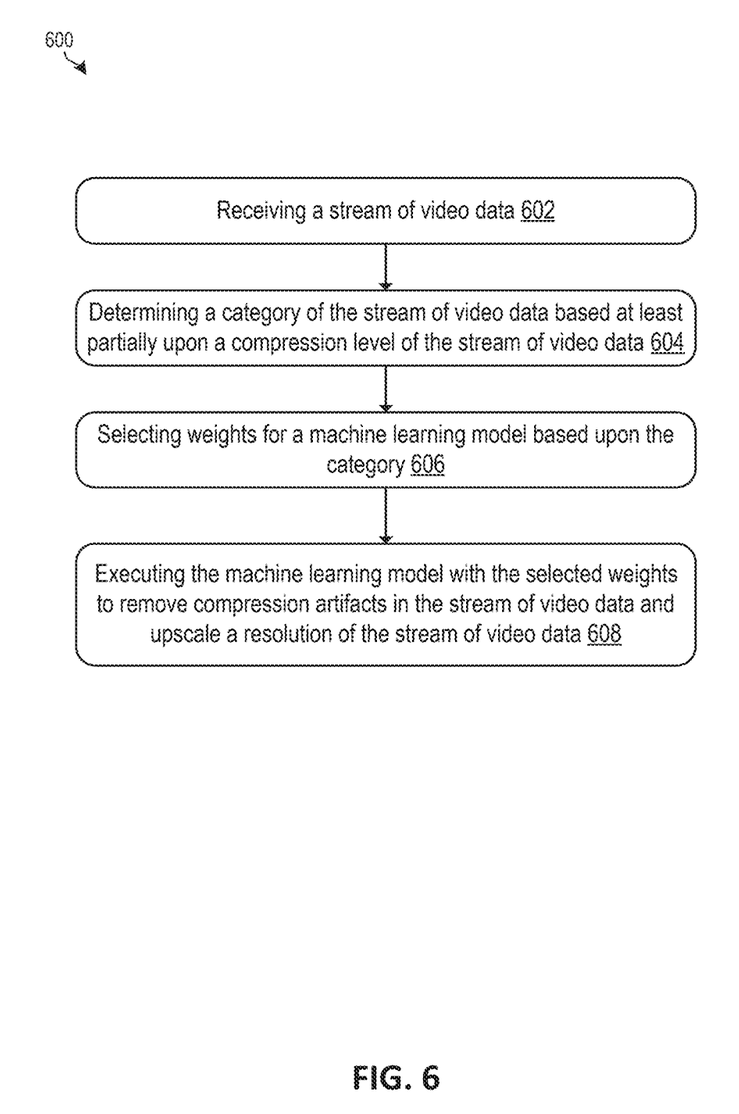
FIG. 6 is a flow chart illustrating an example process for selection and execution of an artifact removal model, in accordance with embodiments of the present disclosure.

FIG. 6 is a flow chart illustrating an example process 600 for generation and execution of experiments, in accordance with embodiments of the present disclosure. The process 600 of FIG. 6 may be executed by one or more computing devices. The actions of process 600 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 600 may be described above with reference to elements of FIGS. 1-5.

Although shown in a particular order, the steps of process 600 may instead be performed in a different order. Additionally, various steps may be performed in parallel in various implementations. Further, some steps may be omitted and/or other steps may be added in accordance with the experiment generation and execution techniques described herein.

Process 600 may begin at action 602, at which an example streaming device receives a stream of video data. For example, a smart television may contact a server 110 requesting a live stream of video data 112 containing a college basketball game.

At action 604, an example classifier executing on the streaming device may determine a category of the stream of video data based at least partially upon a compression level of the stream of video data. For example, the video data 112 of the basketball game may be compressed with a quantization parameter of 25. The classifier 130 may inspect metadata of the video data 112 including a description of the video data 112 and determine via rules based techniques (see FIG. 2), a machine learning model (see FIG. 3), or combinations thereof to determine that the video data 112 contains video of a basketball game. Further, the classifier 130 may detect one or more hard boundaries in one or more slices or frames of the video data 112. This boundary detection, the determination that the video data 112 contains a basketball game, and the intensity and/or the locations of the boundaries may cause the classifier 130 to categorize the video data 112 as a moderately compressed sports stream with mild artifact presence.

At action 606, the example classifier selects weights for a machine learning model based upon the category. For example, the classifier 130 may select an artifact removal model 140 which was trained on moderately compressed sports stream data and which includes a mild smoothing algorithm to remove the hard artifact boundaries. The classifier 130 may also select the weights based upon a desired final resolution. For example, the artifact removal model 140 may be trained to output to displays between 35 and 42 inches diagonally at a 1.85:1 aspect ratio and may be selected from among several moderately-compressed-sports-stream-with-mild-smoothing models trained for different size or aspect ratio displays.

At action 608, the example streaming device executes the machine learning model with the selected weights to remove compression artifacts in the stream of video data and upscale a resolution of the stream of video data. For example, the streaming device 120 may employ hardware accelerator circuitry 408 to execute the artifact removal model 140. The artifact removal model may apply smoothing algorithms to any detected hard edges to mitigate detected artifacts, and may upscale a resolution of a resultant image to fit a desired display. It will be noted that not all embodiments may perform both the artifact removal and the upscaling, and that some embodiments may perform one of the artifact removal and the upscaling without performing the other.

Figure 7:
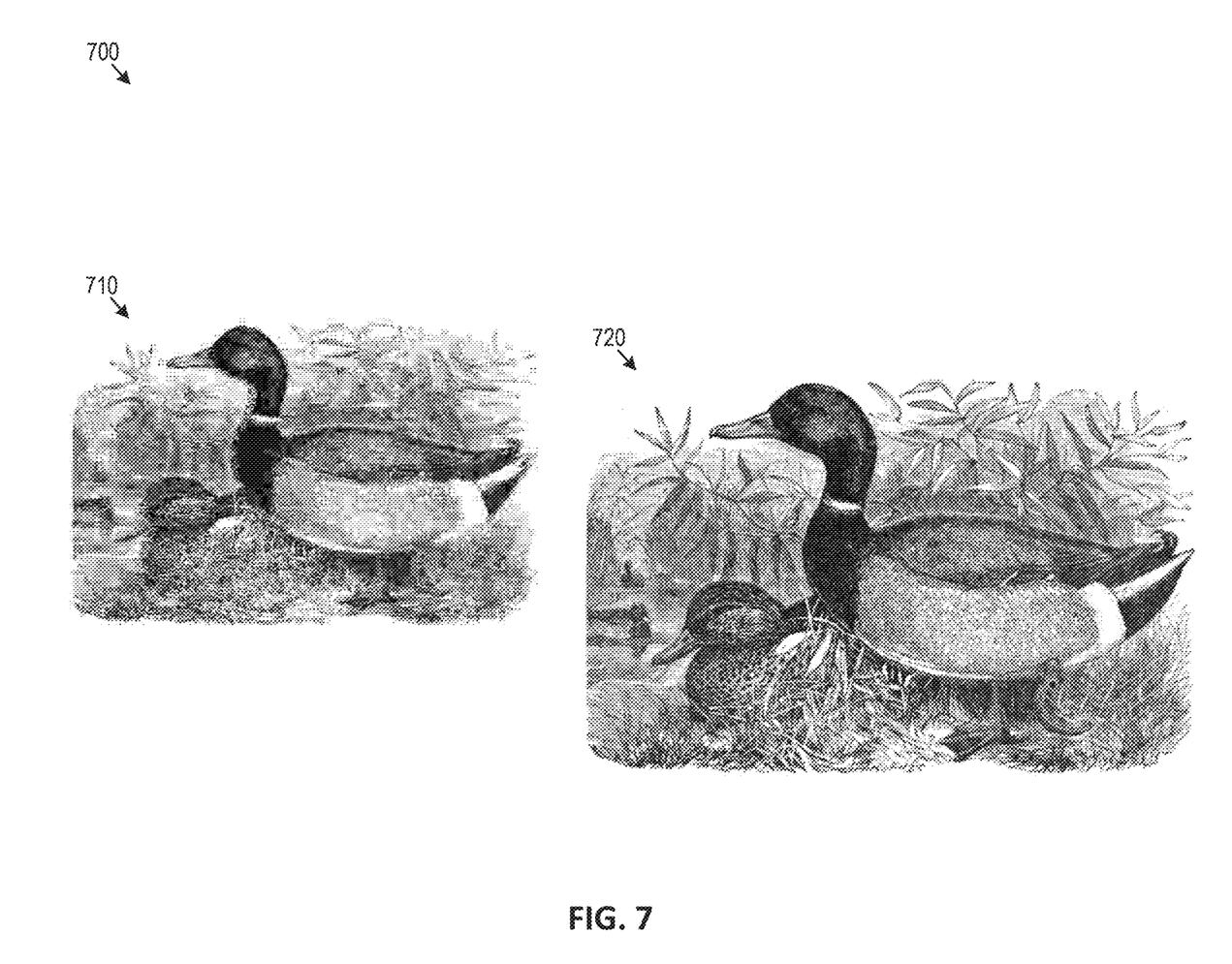
FIG. 7 depicts an example frame from an example stream of video data before and after upscaling and artifact removal, respectively, in accordance with various aspects of the present disclosure.

FIG. 7 depicts an example pair of images 700 with and without compression artifacts. A compressed image 710 is provided on a left side of the pair of images 700. The compressed image 710 has been compressed and decoded, and as such is displayed with numerous distortions which manifest as large textured squares within the compressed image 710. These compression artifacts result in an overall "blurry" effect in the image, and this effect is considered undesirable. A "clean" image 720 is illustrated on a right side of the pair of images 700. This "clean" image 720 has had artifacts smoothed and has been upscaled in resolution.

It will be noted that the "clean" image 720 may not be identical to an original image which produced the compressed image 710, but instead is a "best guess" by an artifact removal model of what the original image might have looked like.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. An electronic device comprising:
    a housing;
    a physical connector extending from the housing to connect to a television;
    a wireless radio;
    a plurality of processors including
        a first processor, and
        a neural network accelerator;
    one or more computer readable media storing processor executable instructions which, when executed using the plurality of processors, cause the electronic device to perform operations comprising
        receiving first video data representing streaming video,
        determining, using a first machine learning model and the first video data, a first classification associated with the first video data,
        selecting, based on the first classification, a first set of weights associated with a second machine learning model,
        generating second video data using the second machine learning model, the first set of weights, and the first video data,
        receiving third video data representing second streaming video,
        determining, using a first machine learning model and the third video data, a second classification associated with the third video data,
        selecting, based on the second classification, a second set of weights associated with a third machine learning model,
        generating fourth video data using the third machine learning model, the second set of weights, and the third video data.

2. The electronic device of claim 1, wherein the second video data represents an upscaled version of the streaming video with one or more compression artifacts removed, and wherein the second machine learning model and the third machine learning model are the same machine learning model.

3. The electronic device of claim 1, wherein the second video data represents an upscaled version of the streaming video with one or more compression artifacts removed, and wherein the second machine learning model and the third machine learning model are different machine learning models.

4. An electronic device comprising:
    a wireless radio;
    one or more processors;
    one or more computer readable media storing processor executable instructions which, when executed using the one or more processors, cause the electronic device to perform operations comprising receiving first video data representing streaming video, determining, using a first machine learning model and the first video data, a first classification associated with the first video data, selecting, based on the first classification, a first set of weights associated with a second machine learning model, generating second video data using the second machine learning model, the first set of weights, and the first video data.

5. The electronic device of claim 4, wherein the second video data has more bits than the first video data.

6. The electronic device of claim 4, wherein the second video data represents an upscaled version of the streaming video.

7. The electronic device of claim 4, wherein the second video data represents an upscaled version of the streaming video with one or more compression artifacts removed.

8. The electronic device of claim 4, wherein the second video data represents a version of the streaming video with one or more compression artifacts removed.

9. The electronic device of claim 4, wherein the one or more computer readable media store processor executable instructions which, when executed using the one or more processors, cause the electronic device to perform operations comprising receiving third video data representing second streaming video, determining, using a first machine learning model and the third video data, a second classification associated with the third video data, selecting, based on the second classification, a second set of weights associated with a third machine learning model;

generating fourth video data using the third machine learning model, the second set of weights, and the third video data.

10. The electronic device of claim 4, wherein the one or more computer readable media store processor executable instructions which, when executed using the one or more processors, cause the electronic device to perform operations comprising receiving third video data representing second streaming video, determining, using a first machine learning model and the third video data, a second classification associated with the third video data, selecting, based on the second classification, a second set of weights associated with the second machine learning model;

generating fourth video data using the second machine learning model, the second set of weights, and the third video data.

11. The electronic device of claim 4, wherein the one or more computer readable media store processor executable instructions which, when executed using the one or more processors, cause the electronic device to perform operations comprising causing playing of streaming video on an electronic display using the second video data.

12. The electronic device of claim 4, wherein the one or more computer readable media store processor executable instructions which, when executed using the one or more processors, cause the electronic device to perform operations comprising sending the second video data to a television via a physical connector of the electronic device.

13. The electronic device of claim 4, wherein the one or more processors comprise a first processor and a neural network accelerator, and wherein the generating of the second video data uses at least the neural network accelerator.

14. The electronic device of claim 4, wherein the electronic device is a television.

15. An electronic device comprising:

a wireless radio;

one or more processors;

one or more computer readable media storing processor executable instructions which, when executed using the one or more processors, cause the electronic device to perform operations comprising receiving first video data representing streaming video, determining, based on the first video data, a first classification associated with the first video data, selecting, based on the first classification, a first set of weights associated with a second machine learning model, and generating second video data using the second machine learning model, the first set of weights, and the first video data.

16. The electronic device of claim 15, wherein the determining of the first classification is based on quantization parameter information associated with the first video data.

17. The electronic device of claim 15, wherein the determining of the first classification is based on metadata included in the first video data.

18. The electronic device of claim 15, wherein the determining of the first classification is based on metadata received with the first video data.

19. The electronic device of claim 15, wherein the determining of the first classification is based on metadata associated with the first video data.

20. The electronic device of claim 15, wherein the determining of the first classification is based on metadata indicating a category of the streaming video.

* * * * *